United States Patent
Gabale (10) Patent No.: US 12,400,453 B2
(45) Date of Patent: Aug. 26, 2025

(54) SYSTEM AND METHOD FOR PREVENTING SHRINKAGE IN A RETAIL ENVIRONMENT USING REAL TIME CAMERA FEEDS

(71) Applicant: INFILECT TECHNOLOGIES PRIVATE LIMITED, Bengaluru (IN)

(72) Inventor: Vijay Gabale, Bengaluru (IN)

(73) Assignee: INFILECT TECHNOLOGIES PRIVATE LIMITED, Bengaluru (IN)

( * ) Notice: Subject to any disclaimer, the term of this patent is extended or adjusted under 35 U.S.C. 154(b) by 120 days.

(21) Appl. No.: 18/022,482

(22) PCT Filed: Jun. 30, 2022

(86) PCT No.: PCT/IN2022/050602
§ 371 (c)(1),
(2) Date: Feb. 21, 2023

(87) PCT Pub. No.: WO2023/275897
PCT Pub. Date: Jan. 5, 2023

(65) Prior Publication Data
US 2024/0169735 A1     May 23, 2024

(30) Foreign Application Priority Data
Jun. 30, 2021   (IN) .............................. 202141029489

(51) Int. Cl.
*G06V 20/52*     (2022.01)
*G06V 10/764*    (2022.01)
(Continued)

(52) U.S. Cl.
CPC ............ *G06V 20/52* (2022.01); *G06V 10/764* (2022.01); *G06V 10/82* (2022.01); *G06V 20/46* (2022.01);
(Continued)

(58) Field of Classification Search
CPC ........ G06V 20/52; G06V 20/70; G06V 20/46; G06V 40/10; G06V 10/82; G06V 40/20; G06V 10/764
(Continued)

(56) References Cited

U.S. PATENT DOCUMENTS

| 9,911,290 B1 * | 3/2018 | Zalewski | .............. H04W 76/10 |
| 10,373,322 B1 * | 8/2019 | Buibas | .................... G06T 7/246 |
| 2020/0019921 A1 * | 1/2020 | Buibas | .................. G06T 19/003 |

* cited by examiner

*Primary Examiner* — Mark Roz (57) ABSTRACT

A need for a system and method for preventing shrinkage in physical retail store environment using real-time camera feeds is fulfilled in the ongoing description by (a) configuring cameras in a retail store forming a distributed on-device-AI (DODA) model (b) sampling two-dimensional (2D) frames from cameras, (c) generating labels and location for at least one object identified using a first unsupervised deep neural network model (DNN), (d) visually classifying anatomical parts of the human body using a second unsupervised DNN, (e) enlarging and enhancing a product based on labels and location using a third unsupervised DNN, (f) generating an index of product associated with a person using a fourth unsupervised DNN by reidentifying objects from cameras, and (f) automatically classifying activity characterizing the movement of objects including a scan activity, an in-bag activity, a no scan activity, a mis-scan activity, and a theft activity to prevent shrinkage.

10 Claims, 7 Drawing Sheets

(51) Int. Cl.
    *G06V 10/82*     (2022.01)
    *G06V 20/40*     (2022.01)
    *G06V 20/70*     (2022.01)
    *G06V 40/10*     (2022.01)
    *G06V 40/20*     (2022.01)

(52) U.S. Cl.
    CPC .............. *G06V 20/70* (2022.01); *G06V 40/10* (2022.01); *G06V 40/20* (2022.01)

(58) Field of Classification Search
    USPC ........................................................ 382/103
    See application file for complete search history.

CONFIGURING A PLURALITY OF CAMERAS EITHER AT A COUNTER OR ON A SURFACE OF THE PHYSICAL RETAIL STORE ENVIRONMENT TO CAPTURE A VIDEO STREAM, WHEREIN THE PLURALITY OF CAMERAS FORM A SUB-NET WITHIN A GIVEN NETWORK OF INTERNET PROTOCOL (IP) ADDRESSES TO RUN A DISTRIBUTED ON-DEVICE-AI (DODA) MODEL COMPRISING A FIRST UNSUPERVISED DEEP NEURAL NETWORK MODEL (DNN), A SECOND UNSUPERVISED DNN, A THIRD UNSUPERVISED DNN, A FOURTH UNSUPERVISED DNN, AND A FIFTH UNSUPERVISED DNN
502

SAMPLING, USING THE DODA MODEL, A SUBSET OF TWO-DIMENSIONAL 2D FRAMES FROM THE VIDEO STREAM OF A FIRST CAMERA
504

GENERATING LABELS AND LOCATION FOR AT LEAST ONE OBJECT IN THE SUBSET OF 2D FRAMES USING THE FIRST UNSUPERVISED DNN, WHEREIN THE AT LEAST ONE OBJECT COMPRISES A PRODUCT OBJECT, A CART OBJECT, A PERSON OBJECT, A BAG OBJECT, OR A SHELF OBJECT
506

VISUALLY CLASSIFYING ANATOMICAL PARTS OF HUMAN BODY FROM THE SUBSET OF 2D FRAMES USING THE SECOND UNSUPERVISED DNN TO DETECT AT LEAST ONE PERSON OBJECT IN THE PHYSICAL RETAIL STORE ENVIRONMENT
508

ENLARGING AND ENHANCING A PART OF THE SUBSET OF 2D FRAMES USING THE THIRD UNSUPERVISED DNN WITH THE LABELS AND LOCATION TO GENERATE AND IDENTIFY AT LEAST ONE PRODUCT OBJECT IN ASSOCIATION WITH THE AT LEAST ONE PERSON OBJECT
510

SYSTEM AND METHOD FOR PREVENTING SHRINKAGE IN A RETAIL ENVIRONMENT USING REAL TIME CAMERA FEEDS

BACKGROUND

Technical Field

The embodiments herein generally relate to computer vision, and more particularly, to a system and method for preventing shrinkage in a retail environment using real-time camera feeds.

Description of the Related Art

Retailers often face willful or inadvertent mis-scans or no-scans either by customers on self-checkout counters or by associates at the manned counters. As a result, each checkout counter at each store is estimated to lose an average of USD 40 per day, on account of 4 to 8 mis-scans or no scans.

Not only at the checkout counters, but the shrinkages may happen at any point in a retail environment, for example, a disgruntled employee pocketing a small but expensive item, or a consumer or shopper hiding an item in a money purse. Hence, it is imperative to track consumer-product interactions, right from entry to exit, as consumers interact with products and retail assets.

A robust, scalable, and accurate solution is required to detect and track consumer activities such as picking a product, placing it back, placing it back on the shelf, pocketing the item, putting it in a cart, scanning it, and eventually bagging it in a shopping bag. In doing, various retail assets such as carts, shelves, and checkout counters need to be identified. Furthermore, the solution must detect, identify, and track a consumer or shopper along with all their assets. Importantly, consumer activities must be correlated with products, and each activity must be correlated with the specific context of the retail store, such as a shelf vs a checkout counter.

Accordingly, there remains a need of addressing the aforementioned technical problems using a system and method for preventing shrinkage in a retail environment using real-time camera feeds.

SUMMARY

In view of the foregoing, an embodiment herein provides a method of preventing shrinkage in a physical retail store environment using real-time camera feeds. The method comprising: (a) configuring a plurality of cameras either at a counter or on a surface of the physical retail store environment to capture a video stream, wherein the plurality of cameras form a sub-net within a given network of internet protocol (IP) addresses to run a distributed on-device-AI (DODA) model comprising a first unsupervised deep neural network model (DNN), a second unsupervised DNN, a third unsupervised DNN, a fourth unsupervised DNN, and a fifth unsupervised DNN, (b) sampling, using the DODA model, a subset of two-dimensional 2D frames from the video stream of a first camera, (c) generating labels and location for at least one object in the subset of 2D frames using the first unsupervised DNN, wherein the at least one object comprises a product object, a cart object, a person object, a bag object, or a shelf object, (d) visually classifying anatomical parts of human body from the subset of 2D frames using the second unsupervised DNN to detect at least one person object in the physical retail store environment, (e) enlarging and enhancing a part of the subset of 2D frames using the third unsupervised DNN with the labels and location to generate and identify at least one product object in association with the at least one person object, (f) generating an index for the at least one product object in association with the at least one person object, wherein the index describes the product object with a machine representation as well as a human-readable representation, (f) reidentifying, using the index, the at least one product object in association with the at least one person object in the video stream of a second camera using the fourth unsupervised DNN by tracking a movement of the at least one product object in the physical retail store environment, and (g) automatically classifying an activity associated with the movement of the at least one product object using the fifth unsupervised DNN to prevent shrinkage in the physical retail store environment, wherein the activity includes a scan activity, an in-bag activity, a no-scan activity, a mis-scan activity, or a theft activity.

In some embodiments, a real-time transaction feed of product object scans is obtained from the physical retail store environment to classify the activity associated with the movement of the at least one object.

In some embodiments, the first unsupervised DNN, the second unsupervised DNN, the third unsupervised DNN, the fourth unsupervised DNN, and the fifth unsupervised DNN are configured in a cloud server that is connected to the plurality of cameras in the given network, wherein the plurality of cameras stream the subset of two-dimensional (2D) frames to the cloud server.

In some embodiments, a real-time push notification is transmitted on the plurality of cameras or a user device upon classifying the activity associated with the movement of the plurality of objects.

In some embodiments, reidentifying the at least one product object further comprises modifying at least one parameter of the plurality of cameras based on the movement of the at least one product object in the physical retail store environment, wherein the at least one parameter comprises pan, tilt, and zoom.

In some embodiments, tracking the movement of the at least one product object in the physical retail store environment further comprises combining a first video stream from the first camera and a second video stream from the second camera to generate an enhanced representation of the physical retail store environment.

In another aspect, there is provided a system of preventing shrinkage in a physical retail store environment using real-time camera feeds. The system comprises (i) a plurality of cameras configured either at a counter or on a surface of the physical retail store environment to capture a video stream, wherein the plurality of cameras form a sub-net within a given network of internet protocol (IP) addresses to run a distributed on-device-AI (DODA) model comprising a first unsupervised deep neural network model (DNN), a second unsupervised DNN, a third unsupervised DNN, a fourth unsupervised DNN, and a fifth unsupervised DNN, (ii) a memory that stores a database and a set of modules, and (iii) a device processor that executes said set of modules, wherein said set of modules comprises: (a) configuring a plurality of cameras either at a counter or on a surface of the physical retail store environment to capture a video stream, wherein the plurality of cameras form a sub-net within a given network of internet protocol (IP) addresses to run a distributed on-device-AI (DODA) model comprising a first unsupervised deep neural network model (DNN), a second unsupervised DNN, a third unsupervised DNN, a fourth unsupervised DNN, and a fifth unsupervised DNN, (b) sampling, using the DODA model, a subset of two-dimensional 2D frames from the video stream of a first camera, (c) generating labels and location for at least one object in the subset of 2D frames using the first unsupervised DNN, wherein the at least one object comprises a product object, a cart object, a person object, a bag object, or a shelf object, (d) visually classifying anatomical parts of human body from the subset of 2D frames using the second unsupervised DNN to detect at least one person object in the physical retail store environment, (e) enlarging and enhancing a part of the subset of 2D frames using the third unsupervised DNN with the labels and location to generate and identify at least one product object in association with the at least one person object, (f) generating an index for the at least one product object in association with the at least one person object, wherein the index describes the product object with a machine representation as well as a human-readable representation, (f) reidentifying, using the index, the at least one product object in association with the at least one person object in the video stream of a second camera using the fourth unsupervised DNN by tracking a movement of the at least one product object in the physical retail store environment, and (g) automatically classifying an activity associated with the movement of the at least one product object using the fifth unsupervised DNN to prevent shrinkage in the physical retail store environment, wherein the activity includes a scan activity, an in-bag activity, a no-scan activity, a mis-scan activity, or a theft activity.

In some embodiments, the processing unit obtains a real-time transaction feed of product object scans from the physical retail store environment to classify the activity associated with the movement of the at least one object.

In some embodiments, the first unsupervised DNN, the second unsupervised DNN, the third unsupervised DNN, the fourth unsupervised DNN, and the fifth unsupervised DNN are configured in a cloud server that is connected to the plurality of cameras in the given network, wherein the plurality of cameras stream the subset of two-dimensional (2D) frames to the cloud server.

In some embodiments, tracking the movement of the at least one product object in the physical retail store environment further comprises combining a first video stream from the first camera and a second video stream from the second camera to generate an enhanced representation of the physical retail store environment.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the view of the foregoing, the need of system and method for preventing shrinkage in a retail environment using real time camera feeds is fulfilled in the ongoing description by: (a) configuring a plurality of cameras either at a counter or on a surface of the physical retail store environment to capture a video stream, wherein the plurality of cameras form a sub-net within a given network of internet protocol (IP) addresses to run a distributed on-device-AI (DODA) model comprising a first unsupervised deep neural network model (DNN), a second unsupervised DNN, a third unsupervised DNN, a fourth unsupervised DNN, and a fifth unsupervised DNN, (b) sampling, using the DODA model, a subset of two-dimensional 2D frames from the video stream of a first camera, (c) generating labels and location for at least one object in the subset of 2D frames using the first unsupervised DNN, wherein the at least one object comprises a product object, a cart object, a person object, a bag object, or a shelf object, (d) visually classifying anatomical parts of human body from the subset of 2D frames using the second unsupervised DNN to detect at least one person object in the physical retail store environment, (e) enlarging and enhancing a part of the subset of 2D frames using the third unsupervised DNN with the labels and location to generate and identify at least one product object in association with the at least one person object, (f) generating an index for the at least one product object in association with the at least one person object, wherein the index describes the product object with a machine representation as well as a human-readable representation, (f) reidentifying, using the index, the at least one product object in association with the at least one person object in the video stream of a second camera using the fourth unsupervised DNN by tracking a movement of the at least one product object in the physical retail store environment, and (g) automatically classifying an activity associated with the movement of the at least one product object using the fifth unsupervised DNN to prevent shrinkage in the physical retail store environment, wherein the activity includes a scan activity, an in-bag activity, a no-scan activity, a mis-scan activity, or a theft activity. Referring now to the drawings, and more particularly to FIGS. 1 through 6, where similar reference characters consistently denote corresponding features throughout the figures, there are shown preferred embodiments.

Figure 1:
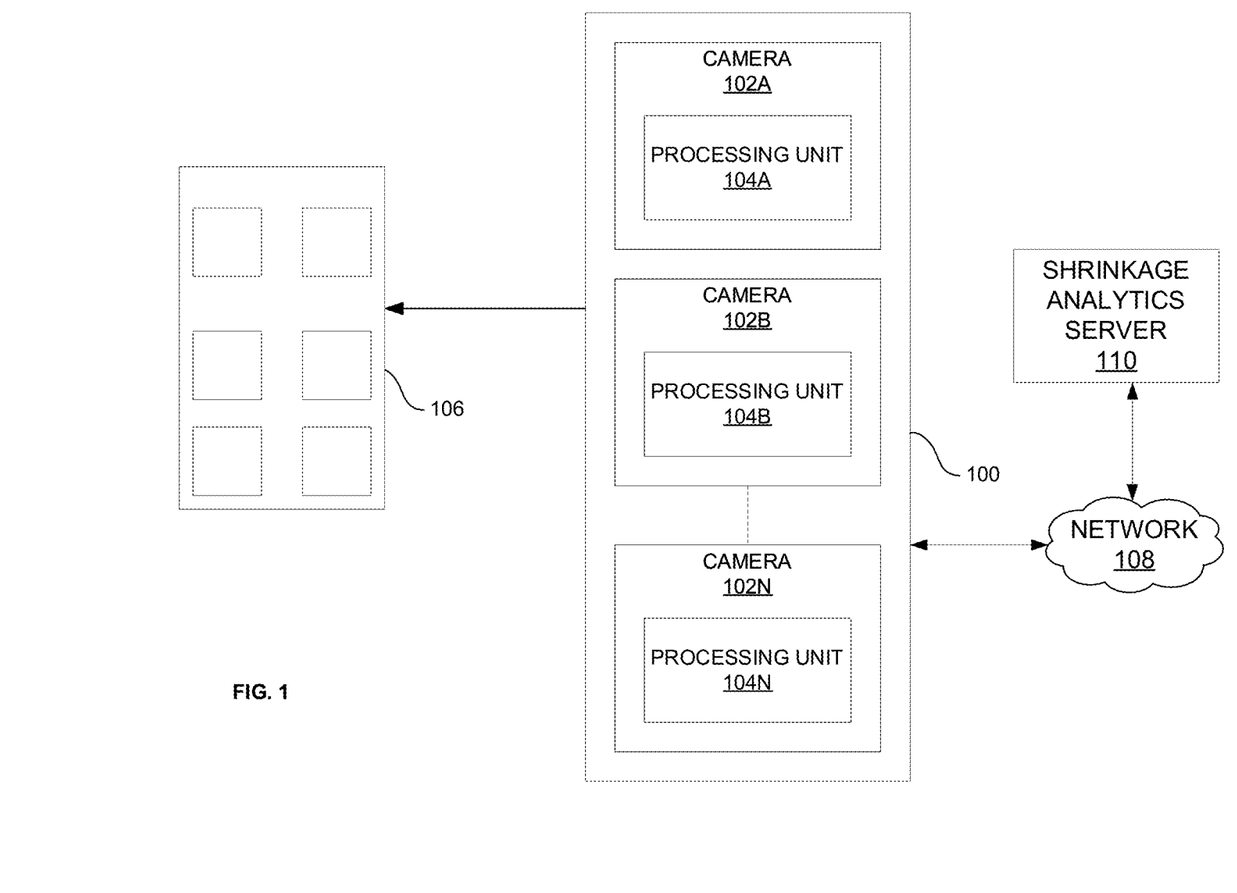
FIG. 1 illustrates a system for preventing shrinkage in a retail environment using real-time camera feeds.

FIG. 1 illustrates a system for preventing shrinkage in a retail environment using real-time camera feeds according to some embodiments herein. The system includes a network of cameras 100 that comprises a plurality of cameras 102A-N including a plurality of processing units 104A-N. The network of cameras 100 is configured in a retail environment 106 to capture media content of the physical retail store environment 106. The network of cameras 100 is connected to a shrinkage analytics server 110 via network 108.

In some embodiments, the plurality of cameras 102A-N may be selected from a camera of a handheld device, a camera of a computing device, a camera of a smartphone, a camera of a virtual reality device or any kind of imaging device that has the processing power to run the machine learning models. In some embodiments, the plurality of cameras 102A-N may be selected from a handheld device, a PDA (Personal Digital Assistant), a tablet, a computer, an electronic notebook or a smartphone.

The plurality of cameras 102A-N are configured either at a counter or on a surface of the physical retail store environment 106 to capture a video stream, wherein the plurality of cameras 102A-N form a sub-net within a given network of internet protocol (IP) addresses to run a distributed on-device-AI (DODA) model. The DODA model includes a first unsupervised deep neural network model (DNN), a second unsupervised DNN, a third unsupervised DNN, a fourth unsupervised DNN, and a fifth unsupervised DNN. The DODA model samples a subset of two-dimensional 2D frames from the video stream of a first camera 102A. Labels and location are generated for one or more objects in the subset of 2D frames using the first unsupervised DNN, where the one or more objects may include a product object, a cart object, a person object, a bag object, or a shelf object. Anatomical parts of human body are visually classified from the subset of 2D frames using the second unsupervised DNN to detect one or more person object in the physical retail store environment 106. One or more parts of the subset of 2D frames are enlarged and enhanced using the third unsupervised DNN with the labels and location to generate and identify one or more product objects in association with one or more person objects. An index if generated the one or more product objects in association with the one or more person objects, where the index describes the product object with a machine representation as well as a human-readable representation.

The one or more product objects are reidentified using the index in association with the one or more person objects in the video stream of a second camera 102B using the fourth unsupervised DNN by tracking a movement of the one or more product objects in the physical retail store environment. An activity associated with the movement of the one or more product objects is automatically classified using the fifth unsupervised DNN to prevent shrinkage in the physical retail store environment, where the activity includes a scan activity, an in-bag activity, a no-scan activity, a mis-scan activity, or a theft activity.

Figure 2:
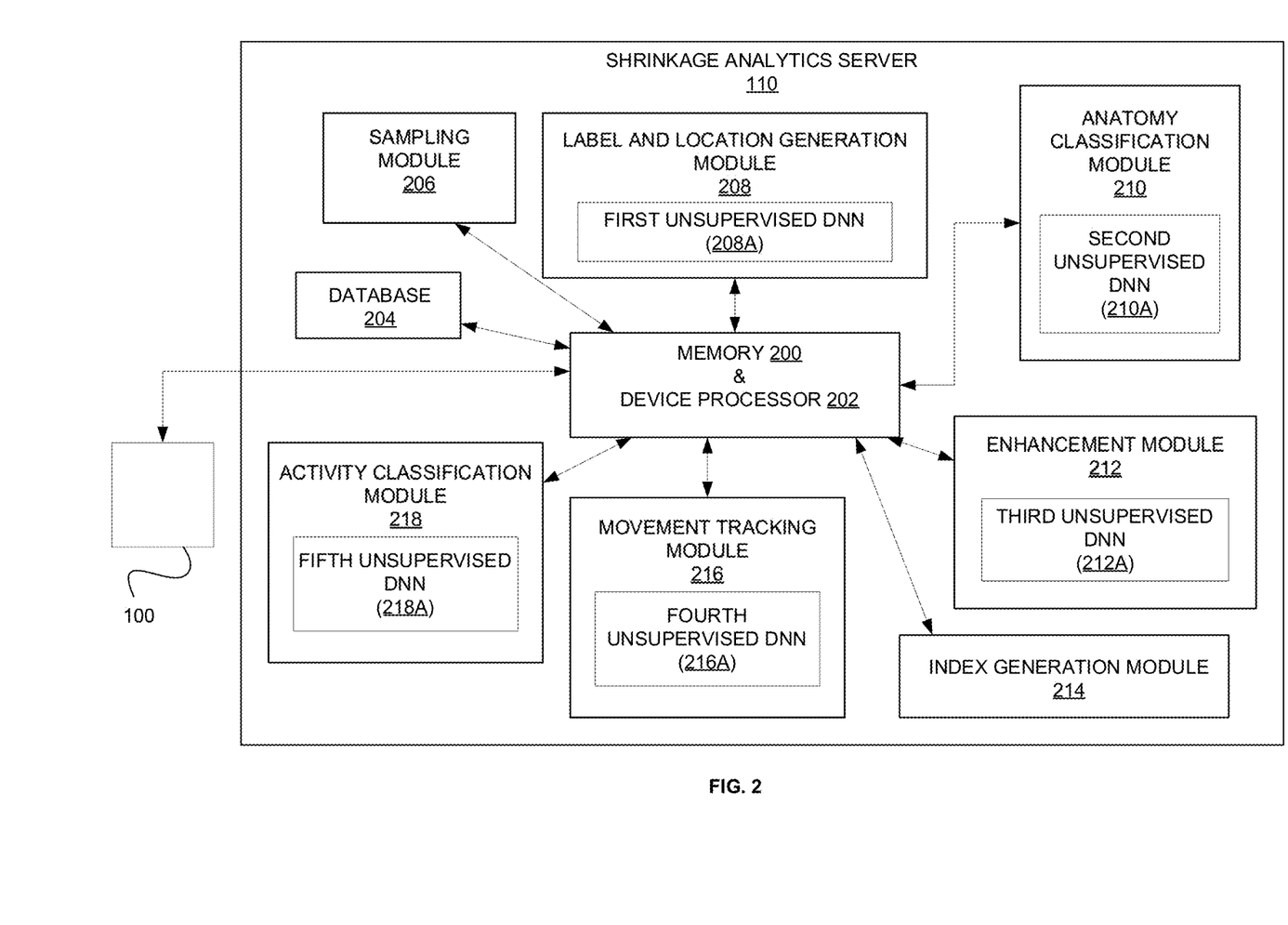
FIG. 2 illustrates an exploded view of a cloud server of FIG. 1 according to some embodiments herein.

FIG. 2 illustrates an exploded view of the shrinkage analytics server 110 of FIG. 1 according to some embodiments herein. The shrinkage analytics server 110 includes a memory 200 and a device processor 202 that is connected to a database 204, a sampling module 206, a label and location generating module 208 that includes a first unsupervised DNN 208A, an anatomy classification module 210 that includes a second unsupervised DNN 210, an enhancement module 212 that includes a third unsupervised DNN 212A, an index generation module 214, a movement tracking module 216 that includes a fourth unsupervised DNN 216A and an activity classification module 218 that includes a fifth unsupervised DNN 218A.

The plurality of cameras 102A-N are configured either at a counter or on a surface of the physical retail store environment 106 to capture a video stream, where the plurality of cameras 102A-N form a sub-net within a given network of internet protocol (IP) addresses to run a distributed on-device-AI (DODA) model. The DODA model includes the first unsupervised DNN 208A, the second unsupervised DNN 210A, the third unsupervised DNN 212A, the fourth unsupervised DNN 216A and the fifth unsupervised DNN 218A.

The sampling module 206 samples, using the DODA model, a subset of two-dimensional 2D frames from the video stream of the first camera 102A. The sampling module 206 performs intelligent sampling of frames from the video stream to select most useful frames, thereby reducing the compute and storage requirements.

The label and location generation module 208 generates labels and location for one or more objects in the subset of 2D frames using the first unsupervised DNN 208A, where the one or more objects comprises a product object, a cart object, a person object, a bag object, or a shelf object. The first unsupervised DNN 208A includes Detector AI models that take an image or a sequence of images (2D frames) as an input and outputs the labels (different objects such as a product object, or a person) and their locations (a box or segment around those objects in a frame). For example, the first unsupervised DNN 208A identifies a cart and its location in a 2D frame, and the cart can be located by a segment or a box in the frame. The first unsupervised DNN 208A works in an unsupervised manner to determine differences in two or more 2D consecutive frames to track a set of pixels that move together in a joint manner. Once a set of such pixels are identified based on frames N to frame N+M, the first unsupervised DNN 208A takes a decision to place a segment or a box on the underlying object with respect to frame N+M+1.

In some embodiments, the first unsupervised DNN 208A work to detect a plurality of product objects in any given 2D frame. The first unsupervised DNN 208A then automatically tracks a movement of each of the plurality of product objects from one frame to another frame.

The anatomy classification module 210 visually classifies anatomical parts of human body from the subset of 2D frames using the second unsupervised DNN 210A to detect one or more person objects in the physical retail store environment. The anatomy classification module 210 includes human detection and human key point detection models that are used to get a location of one or more person objects, hands and legs or any anatomical parts of a human body in a particular frame, including the location of each of the fingers.

The enhancement module 212 enlarges and enhances a part of the subset of 2D frames using the third unsupervised DNN 212A with the labels and location to generate and identify one or more product objects in association with the one or more person objects. In some embodiments, the second unsupervised DNN 210A may include classifier models that take an element detected by the first unsupervised DNN 208A and determines a more detailed representation of the product object (example the first unsupervised DNN 208A detects a product object, and the classifier models determine name of the SKU, a form of the product object, packaging of the product object, etc.). In some embodiments, the second unsupervised DNN 210A may identify various retail elements such as carts, checkout counter, shelves, scanner, bag, wallet, indicator lights, etc. Given only once instance of a new object or a pattern (such as a new type of cart), the classifier models automatically identify that object or pattern as discovered in different 2D frames.

The third unsupervised DNN 212A includes super-resolution AI models that zoom in on certain parts of the 2D frame, enlarge and enhance it without losing any resolution or quality of the frame, and run the above classifier models of the first unsupervised DNN 208A to identify small size objects. This is especially useful to track theft of small sized but highly expensive product objects. In some embodiments, the enhancement module 212 may include a neural network to identify a particular stock keeping unit (SKU), including a brand, a sub-brand and a grammage of the one or more product objects based on the product packaging or design of the one or more product objects. In some embodiments, the enhancement module 212 may include a neural network to identify a particular SKU based on a bar code, a QR code, a EAN or universal product code (UPC) displayed on the one or more product objects. In some embodiments, the enhancement module 212 may include a neural network to identify a brand of the product using a brand logo on the packaging or design of the one or more product objects. In some embodiments, the enhancement module 212 may include a neural network to identify a form of the one or more product objects using a shape, a size, or a color of the one or more product objects, including a bottle, a box, a carton box, etc.

The index generation module 214 generates an index for the one or more product objects in association with the one or more person objects, where the index describes the product object with a machine representation as well as a human-readable representation.

The movement tracking module 216 reidentifies, using the index, the one or more product objects in association with the one or more person objects in the video stream of a second camera 102B using the fourth unsupervised DNN 216A by tracking a movement of the one or more product objects in the physical retail store environment 106. The movement tracking module 216 converts a pixel distance in the subset of 2D frames into physical distance in centimeters using pixel to centimeter parameter configuration for the plurality of camera 102A-N. Without having access to the transaction logs, and by tracking the person-product activity and interaction, the shrinkage analytics server 110 determines if the product object was scanned or not by measuring distance of the product object from a scanning gun detected, or by tracking a scanning indicator of the scanning gun.

In some embodiments, the fourth unsupervised DNN 216A includes object re-identification models that track movement of products objects, retail assets, or people within a camera 102A or across the plurality of cameras 102A-N. When the fourth unsupervised DNN 216A is run on a distributed intelligent camera network as on-device-AI, each camera can share an index of each object describing that object with a machine representation as well as a human-readable representation, with other cameras. Thus, the rest of the cameras can start tracking the same object once it appears in its field of view. When the fourth unsupervised DNN 216A is run in a cloud environment (where a central algorithm processes video streams from the plurality of cameras 102A-N), the index is generated by the shrinkage analytics server 110 in a central place so that objects identified in video streams of different cameras can be re-identified by referring to the index.

The activity classification module 218 automatically classifies an activity associated with the movement of the one or more product objects using the fifth unsupervised DNN 218A to prevent shrinkage in the physical retail store environment 106, where the activity includes a scan activity, an in-bag activity, a no-scan activity, a mis-scan activity, or a theft activity.

The fifth unsupervised DNN 218A include activity recognition models that combine outputs from the first unsupervised DNN 208A, The second unsupervised DNN 210A, the third unsupervised DNN 212A, and the fourth unsupervised DNN 216A. The AI models of the fifth unsupervised DNN 218A receive a set of 2D frames as input and identify different activities as an output.

In some embodiments, the activity classification module 218 may generate buckets of activity as follows. For example, for activity "Product carried in hand", the activity classification module 218 may use a neural network to identify one or more product objects and another neural network to identify human key points. For example, for activity "Product carried in cart/shopping basket", the activity classification module 218 may use a neural network to identify a cart object and another neural network to identify one or more product objects. For example, for activity "Product picked up for scanning from cart/shopping basket" the activity classification module 218 may use a neural network to identify one or more product objects, another neural network to identify a cart object, and yet another neural network to identify human key points. For example, for activity "Product scanned", the activity classification module 218 may use a neural network to identify one or more product objects, another neural network to identify human key points, another neural network to identify a scanner object (either an onboard scanner or a handheld scanner) and scanner states (color states: green: not scanned, red: scanned, orange: problem in scanning). For example, for activity "Product dropped in bagging area", the activity classification module 218 may use a neural network to identify one or more product objects and another neural network to identify a bagging area. For example, for activity "Product bagged in the customer bag" the activity classification module 218 may use a neural network to identify one or more product objects and another neural network to identify a customer bag, for example, for activity "Product bagged in customer pockets", the activity classification module 218 may use a neural network to identify one or more product objects and another neural network to identify a customer clothing. For example, for activity "Product was placed on top of another product", the activity classification module 218 may use neural networks to identify a plurality of product objects.

Using a combination of aforementioned examples of activity identification, the activity classification module 218 may generate buckets of shrinkage cases in the physical retail store environment 106 for classifying activity. For example, "Product was carried in cart and bagged in the customer bag without scanning", "Product was carried in hand and bagged in the customer bag without scanning", "Product was carried in cart and bagged in the customer pocket without scanning", "Product was carried in hand and bagged in the customer pocket without scanning", "Product was carried in hand and carried forward without scanning", "Product was not scanned as another product was kept on the top", and "Product identification by visual system differs from product scanned as it appears in point-of-sale-scan". When a product object is not identified by visual system at SKU level (as the full packaging or QR/code on the product may not be visible), access to real-time point-of-sale-scanning feed is obtained from the physical retail store environment to assign an SKU accurately to the product object identified by the shrinkage analytics server 110.

The shrinkage analytics server 110 does not require access to transaction logs of the product objects scanned at a checkout counter of the physical retail store environment 106 to be able to classify the activities. The shrinkage analytics server 110 tracks the product object and its attributes, the person object and their attributes, and checkout counter indicators in space and time (e.g., did the person hold the product object in front of the scanner for at least M seconds with the scanning indicator turned ON) to accurately classify activity.

In some embodiments, a real-time transaction feed of product object scans is obtained from the physical retail store environment to classify the activity associated with the movement of the at least one object.

In some embodiments, the first unsupervised DNN, the second unsupervised DNN, the third unsupervised DNN, the fourth unsupervised DNN, and the fifth unsupervised DNN are configured in a cloud server that is connected to the plurality of cameras in the given network, wherein the plurality of cameras stream the subset of two-dimensional (2D) frames to the cloud server.

In some embodiments, a real-time push notification is transmitted on the plurality of cameras or a user device upon classifying the activity associated with the movement of the plurality of objects.

In some embodiments, reidentifying the at least one product object further comprises modifying at least one parameter of the plurality of cameras based on the movement of the at least one product object in the physical retail store environment, wherein the at least one parameter comprises pan, tilt, and zoom. A sixth unsupervised DNN controls pan, tilt, and zoom parameter (as available) on the plurality of cameras 102A-N to track, locate, and capture different activities of the product objects in the physical retail store environment 106. The sixth unsupervised DNN takes input from the first unsupervised DNN 208A, the second unsupervised DNN 210A, the third unsupervised DNN 212A, the fourth unsupervised DNN 216A and the fifth unsupervised DNN 218A, and decides to focus on activities of one or more person objects or store-staff person objects based on the time spent in handling a product object, time spent at a retail asset, the number of people in a group of consumers, activities identified so far, the size of the product object identified, etc.

In some embodiments, tracking the movement of the at least one product object in the physical retail store environment further comprises combining a first video stream from the first camera and a second video stream from the second camera to generate an enhanced representation of the physical retail store environment.

The shrinkage analytics server 110 is completely unsupervised and is configured for retail environments. The shrinkage analytics server 110 tracks a chunk of pixel similarities and differences that move together across a set of 2D frames of the video stream obtained from the plurality of cameras 102A-N. In some embodiments, the first unsupervised DNN 208A is coupled with the second unsupervised DNN 210A for human finger-point detection, to track the journey of a product object in the physical retail store environment 106 from a cart object or a basket object to a bagging area of the physical retail store environment 106.

The shrinkage analytics server 110 explicitly detects onboard scanners or scanning guns, and light indicators, and keeps track of the movement of product objects and scanners with respect to each other. The shrinkage analytics server 110 includes the DODA model that is a special cascading AI model comprising of the first unsupervised DNN 208A, the second unsupervised DNN 210A, the third unsupervised DNN 212A, the fourth unsupervised DNN 216A, and the fifth unsupervised DNN 218A. The DODA model enables the shrinkage analytics server 110 to detect, locate, and track even small sized product objects from the video stream obtained from the plurality of cameras 102A-N.

The shrinkage analytics server 110 is of advantage that access to transaction logs or sequence of products scanned is not required for classifying activity associated with the product objects in the physical retail store environment 106. Neither real-time nor post transaction logs are required for the shrinkage analytics server 110. The shrinkage analytics server 110 does not even require an electronic shopping cart for classifying activity associated with the product objects in the physical retail store environment 106. The shrinkage analytics server 110 eliminates the need of depth sensing cameras, external theft detection device such as RFID readers or bar-code readers or Wi-Fi signals or other form of input devices such as audio streams except video streams.

Figure 3:
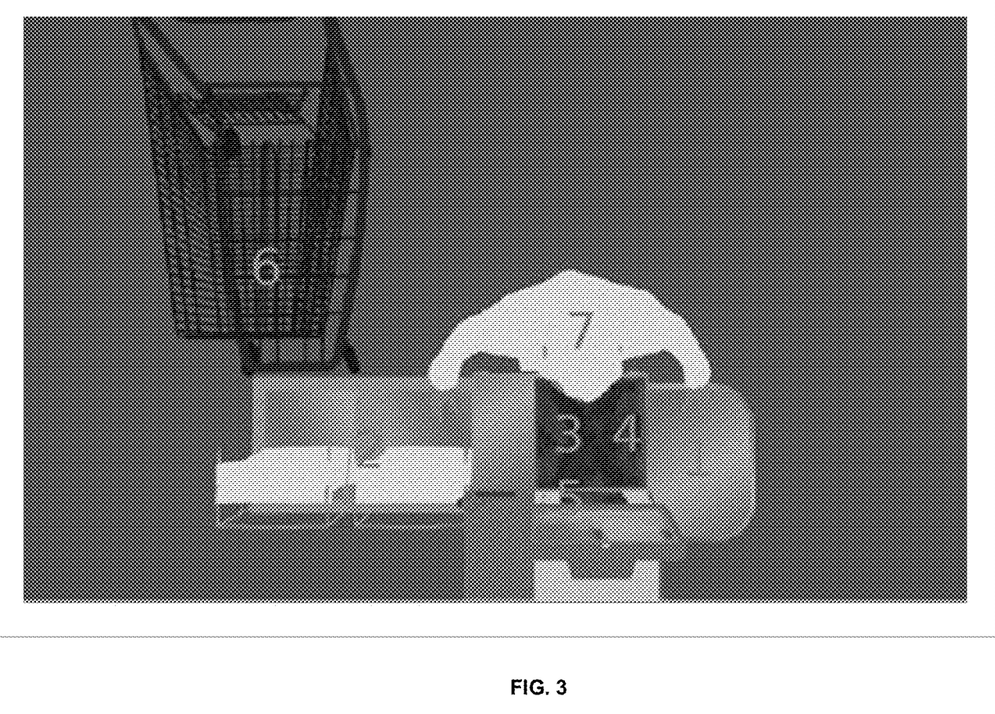
FIG. 3 illustrates a camera feed of a scan area of the retail environment of FIG. 1 according to some embodiments herein.

In some embodiments, if an over-head camera at a checkout counter in the physical retail store environment 106 captures an appropriate view (as illustrated in FIG. 3) the shrinkage analytics server 110 eliminates a need of multi-camera system to classify activity associated with the product objects in the physical retail store environment 106 and can work with just one camera.

The shrinkage analytics server 110 is of advantage that it eliminates the need of a n optical flow or such explicit motion tracking methods that determine trajectory, speed, or orientation of various objects in the physical retail store environment 106. Further, the shrinkage analytics server 110 does not need to be pre-configured for any previous or pre-defined suspicious activities and automatically classifies activity associated with the product objects in the physical retail store environment 106

FIG. 3 illustrates a camera feed of a scan area of the retail environment of FIG. 1 according to some embodiments herein. The cloud server 110 does not require a multi-camera infrastructure to detect the shrinkages if an overhead camera at the checkout counter captures an appropriate view, as shown in the figure. As an example of no-scan events of one or more product objects at the checkout counter, the no-scan event happens when a customer picks up an item from the cart or basket but directly places it in their bag without getting that item scanned. This event may be recorded by the camera placed on the top of the checkout counter. The camera feed of the scan area is shown in FIG. 3. Using the cloud server 110 that can track one or more product objects, people, and processes along with identifying and re-identifying people and one or more product objects across frames within a video stream from a camera, it may be determined if the one or more product objects was offered to be scanned to the scanner or if it was directly placed from a cart/basket into shopping bag.

Figure 4:
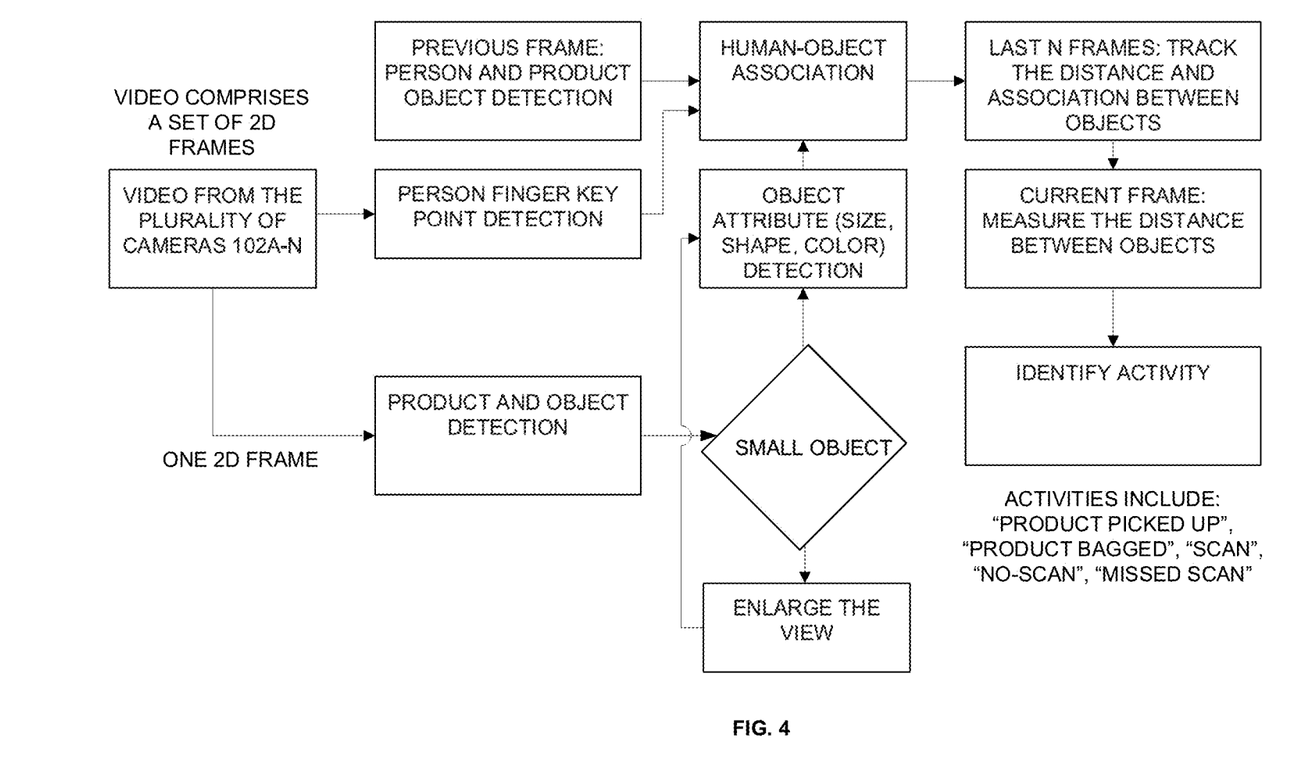
FIG. 4 illustrates an exemplary process flow diagram of for preventing shrinkage in a retail environment using real-time camera feeds according to an embodiment herein.

FIG. 4 illustrates an exemplary process flow diagram of for preventing shrinkage in a retail environment using real-time camera feeds according to an embodiment herein. A video is obtained from the plurality of cameras 102A-N and one 2D frame is used for product and object detection. The set of 2D frames from the video are used for person finger key point detection and a previous frame is used for person and product object detection, which proceeds to a human-object association. If the product and object detected is a small object, the view is enlarged, and the object attributes are determined. Object attributes may include a size, a shape, or a color of the object. Last N frames of the video is used to track a distance and association between objects. A current frame is used to measure the distance between objects and the activity is identified. The activities include "PRODUCT PICKED UP", "PRODUCT BAGGED", "SCAN", "NO-SCAN", "MISSED SCAN".

Figure 5A:
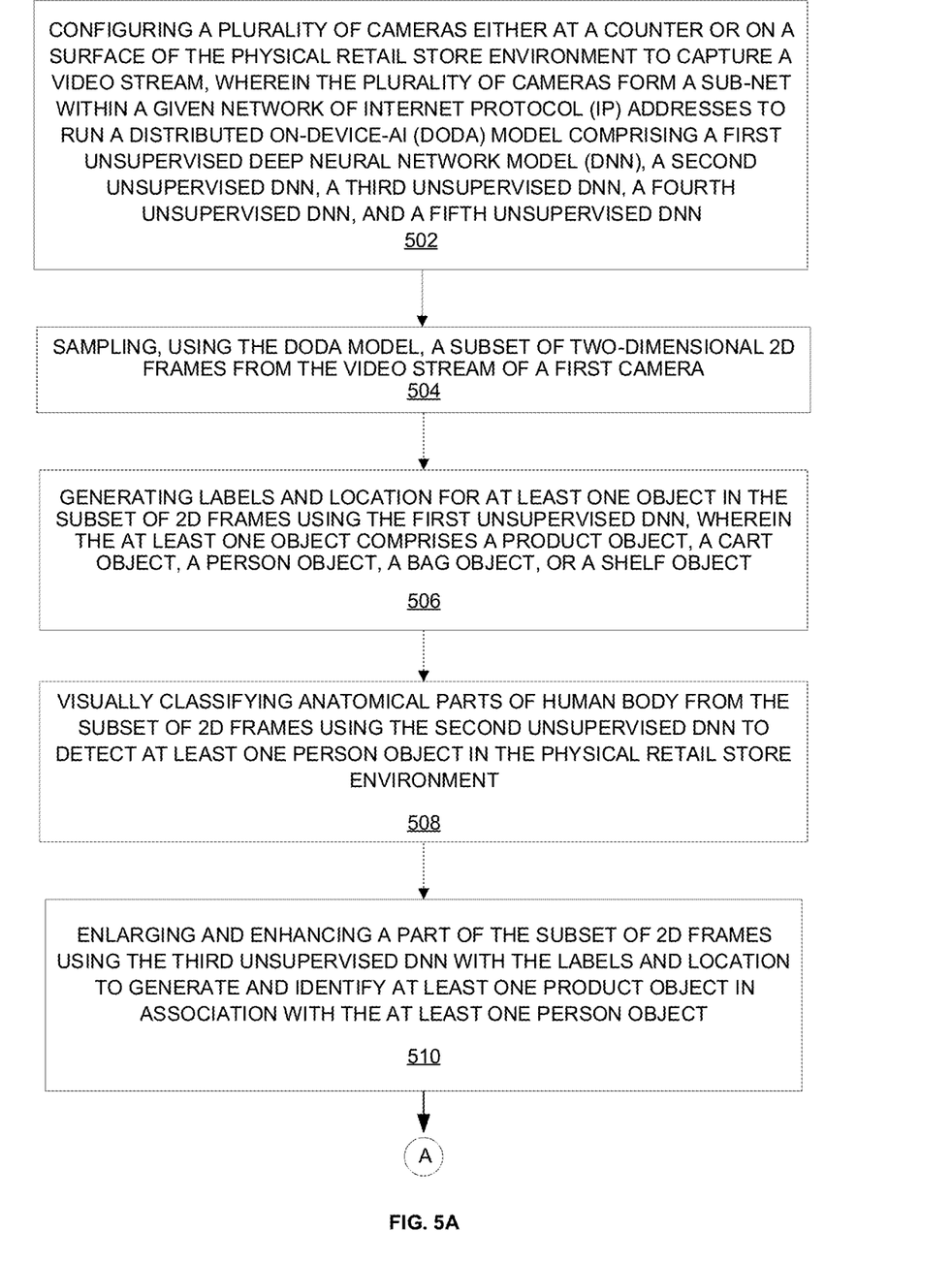
FIGS. 5A and 5B are flow diagrams that illustrate a method of preventing shrinkage in a retail environment using real-time camera feeds according to some embodiments herein.
Figure 5B:
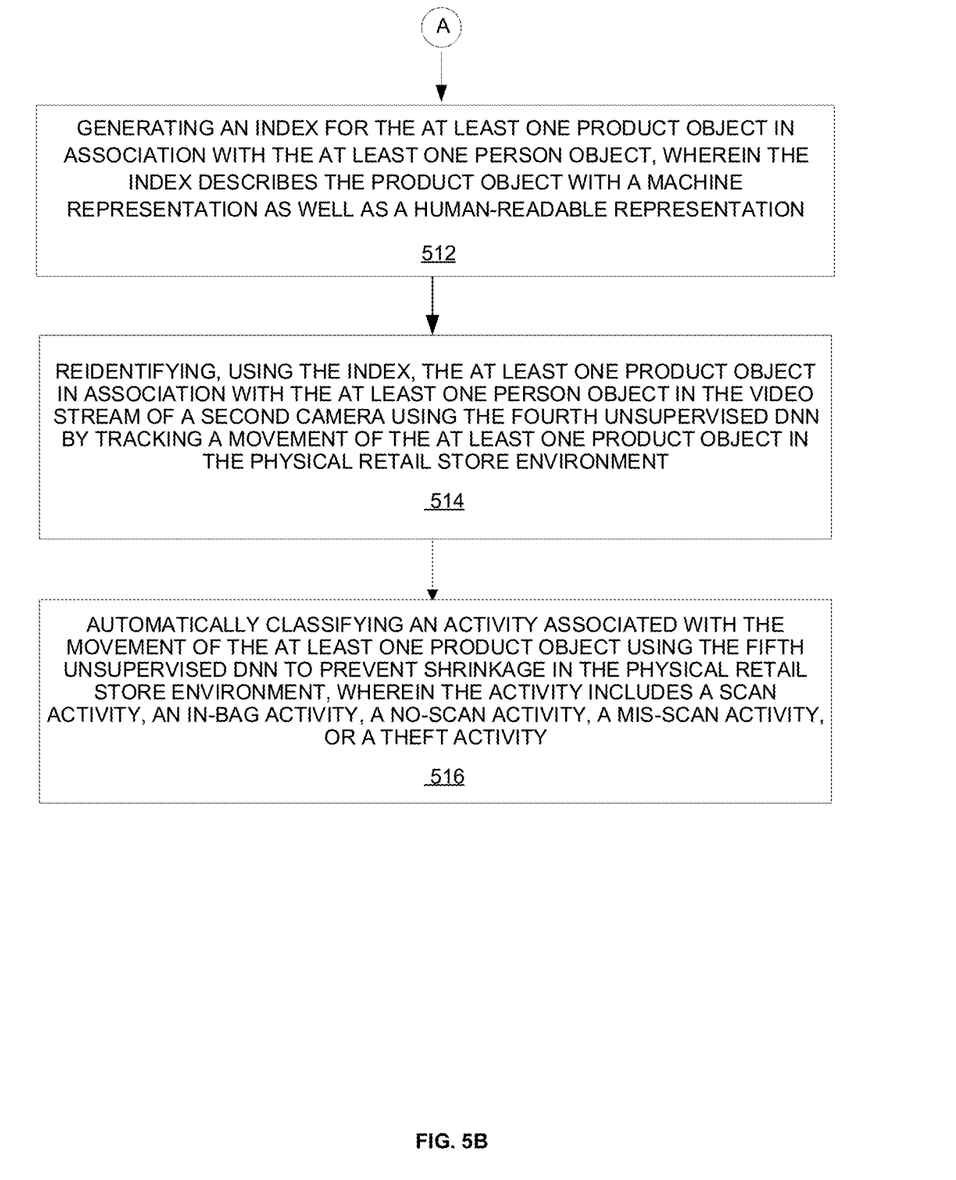

FIGS. 5A and 5B are flow diagrams that illustrate a method of preventing shrinkage in a retail environment using real-time camera feeds according to some embodiments herein. At step 502, the method includes configuring a plurality of cameras either at a counter or on a surface of the physical retail store environment to capture a video stream, wherein the plurality of cameras form a sub-net within a given network of internet protocol (IP) addresses to run a distributed on-device-AI (DODA) model comprising a first unsupervised deep neural network model (DNN), a second unsupervised DNN, a third unsupervised DNN, a fourth unsupervised DNN, and a fifth unsupervised DNN. At step 504, the method includes sampling, using the DODA model, a subset of two-dimensional 2D frames from the video stream of a first camera. At step 508, the method includes generating labels and location for at least one object in the subset of 2D frames using the first unsupervised DNN, wherein the at least one object comprises a product object, a cart object, a person object, a bag object, or a shelf object. At step 510, the method includes visually classifying anatomical parts of human body from the subset of 2D frames using the second unsupervised DNN to detect at least one person object in the physical retail store environment. At step 512, the method includes enlarging and enhancing a part of the subset of 2D frames using the third unsupervised DNN with the labels and location to generate and identify at least one product object in association with the at least one person object. At step 514, the method includes generating an index for the at least one product object in association with the at least one person object, wherein the index describes the product object with a machine representation as well as a human-readable representation. At step 516, the method reidentifying, using the index, the at least one product object in association with the at least one person object in the video stream of a second camera using the fourth unsupervised DNN by tracking a movement of the at least one product object in the physical retail store environment. At step 518, the method includes automatically classifying an activity associated with the movement of the at least one product object using the fifth unsupervised DNN to prevent shrinkage in the physical retail store environment, wherein the activity includes a scan activity, an in-bag activity, a no-scan activity, a mis-scan activity, or a theft activity.

The method is completely unsupervised and based on an algorithm that is specifically designed for retail environments, that tracks a chunk of pixel similarities and differences that move together across a set of frames. A product detection algorithm is coupled with human finger-point detection algorithm to track the journey of a product from a cart or basket to a bagging area in the retail environment 106. The method explicitly detects onboard scanners or scanning guns, and the light indicators, and keeps track of the movement of products and scanners with respect to each other. The method has a special cascading AI model design that helps it detect, locate, and track small size items in the video stream from the one or more cameras 102A-N. The method is advantageous that it does not need access to transaction logs, or the sequence of products scanned, neither real-time nor post transaction or any such electronic shopping cart. The method is of advantage that it does not require access to depth-sensing cameras and further does not need access to any external theft detection device such as RFID readers or bar-code readers or Wi-Fi signals or any other form of inputs such as audio streams except video streams.

The method is advantageous that it does not need any optical flow or any such explicit motion tracking algorithm that computes the trajectory, speed, or orientation of various objects and does not need to be pre-configured for any previous or pre-defined suspicious activities.

The various systems and corresponding components described herein and/or illustrated in the figures may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The systems that include electronic circuits process computer logic instructions capable of providing digital and/or analog signals for performing various functions as described herein. The various functions can further be embodied and physically saved as any data structures, data paths, data objects, data object models, object files, and database components. For example, the data objects could include a digital packet of structured data. Example data structures may include any an array, tuple, map, union, variant, set, graph, tree, node, and an object, which may be stored and retrieved by computer memory and may be managed by processors, compilers, and other computer hardware components. The data paths can be part of a computer CPU or GPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any tables, indexes, views, stored procedures, and triggers.

For example, the embodiments herein can provide a computer program product configured to include a pre-configured set of instructions, which when performed, can result in actions as stated in conjunction with various figures herein. For example, the pre-configured set of instructions can be stored on a tangible non-transitory computer-readable medium. For example, the tangible non-transitory computer-readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer-readable storage media can be any available media that can be accessed by a general-purpose or special-purpose computer, including the functional design of any special-purpose processor as discussed above. By way of example, and not limited, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), and a rigid magnetic disk, and an optical disk. Current examples of optical disks include compact disk-read-only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during the actual execution of the program code, bulk storage, and cache memories which provide temporary storage of at least some program code to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

Figure 6:
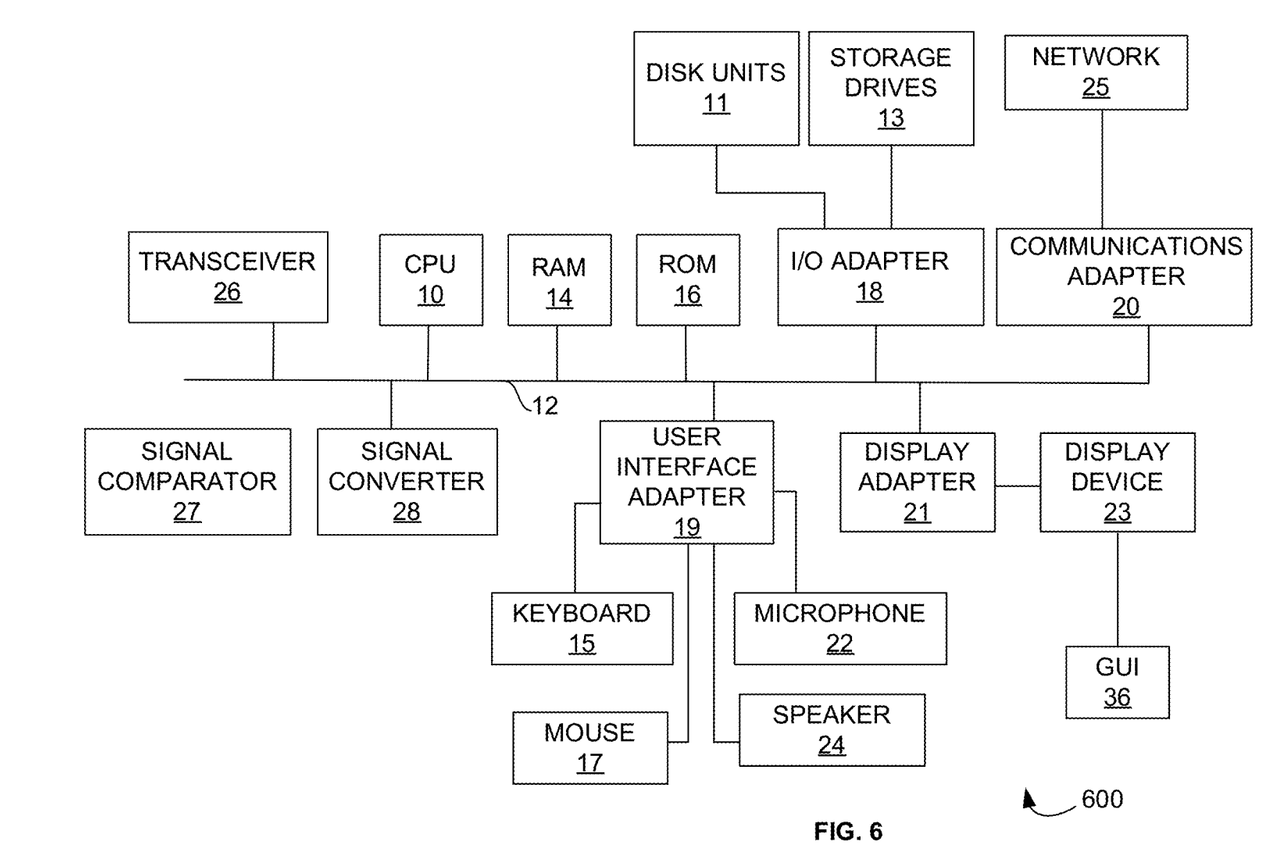
FIG. 6 is a representative hardware environment for practicing the embodiments herein with respect to FIG. 1 through 5B.

A representative hardware environment for practicing the embodiments herein is depicted in FIG. 6, with reference to FIGS. 1 through 5B. This schematic drawing illustrates a hardware configuration of a software development device/computer system 600 in accordance with the embodiments herein. The system 600 comprises at least one processor or central processing unit (CPU) 10. The CPUs 10 are interconnected via system bus 12 to various devices such as random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 600 can read the inventive instructions on the program storage devices and follow these instructions to execute the methodology of the embodiments herein. The system 600 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for description and not of limitation. Therefore, while the embodiments herein have been described in terms of preferred embodiments, those skilled in the art will recognize that the embodiments herein can be practiced with modification within the scope.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for description and not of limitation.

I claim:

1. A method of preventing shrinkage in a physical retail store environment (106) using real-time camera feeds, wherein the method comprising:
   configuring a plurality of cameras (102A-N) either at a counter or on a surface of the physical retail store environment (106) to capture a video stream, wherein the plurality of cameras (102A-N) form a sub-net within a given network of internet protocol (IP) addresses to run a distributed on-device-AI (DODA) model comprising a first unsupervised deep neural network model (DNN) (208A), a second unsupervised DNN (210A), a third unsupervised DNN (212A), a fourth unsupervised DNN (216A), and a fifth unsupervised DNN (218A);
   sampling, using the DODA model, a subset of two-dimensional 2D frames from the video stream of a first camera (102A);
   generating labels and location for at least one object in the subset of 2D frames using the first unsupervised DNN (208A), wherein the at least one object comprises a product object, a cart object, a person object, a bag object, or a shelf object;
   visually classifying anatomical parts of human body from the subset of 2D frames using the second unsupervised DNN (210A) to detect at least one person object in the physical retail store environment (106);
   enlarging and enhancing a part of the subset of 2D frames using the third unsupervised DNN (212A) with the labels and location to generate and identify at least one product object in association with the at least one person object;
   generating an index for the at least one product object in association with the at least one person object, wherein the index describes the product object with a machine representation as well as a human-readable representation;
   reidentifying, using the index, the at least one product object in association with the at least one person object in the video stream of a second camera (102B) using the fourth unsupervised DNN (216A) by tracking a movement of the at least one product object in the physical retail store environment (106); and
   automatically classifying an activity associated with the movement of the at least one product object using the fifth unsupervised DNN (218A) to prevent shrinkage in the physical retail store environment (106), wherein the activity includes a scan activity, an in-bag activity, a no-scan activity, a mis-scan activity, or a theft activity.

2. The method as claimed in claim 1, wherein the method further comprises obtaining a real-time transaction feed of product object scans from the physical retail store environment (106) to classify the activity associated with the movement of the at least one object.

3. The method as claimed in claim 1, wherein the first unsupervised DNN (208A), the second unsupervised DNN (210A), the third unsupervised DNN (212A), the fourth unsupervised DNN (216A), and the fifth unsupervised DNN (218A) are configured in a cloud server that is connected to the plurality of cameras (102A-N) in the given network, wherein the plurality of cameras (102A-N) stream the subset of two-dimensional (2D) frames to the cloud server.

4. The method as claimed in claim 3, wherein a real-time push notification is transmitted on the plurality of cameras (102A-N) or a user device upon classifying the activity associated with the movement of the plurality of objects.

5. The method as claimed in claim 1, wherein reidentifying the at least one product object further comprises modifying at least one parameter of the plurality of cameras (102A-N) based on the movement of the at least one product object in the physical retail store environment (106), wherein the at least one parameter comprises pan, tilt, and zoom.

6. The method as claimed in claim 1, wherein tracking the movement of the at least one product object in the physical retail store environment (106) further comprises combining a first video stream from the first camera (102A) and a second video stream from the second camera (102B) to generate an enhanced representation of the physical retail store environment (106).

7. A system of preventing shrinkage in a physical retail store environment (106) using real-time camera feeds, wherein the system comprises:
   a plurality of cameras (102A-N) configured either at a counter or on a surface of the physical retail store environment (106) to capture a video stream, wherein the plurality of cameras (102A-N) form a sub-net within a given network of internet protocol (IP) addresses to run a distributed on-device-AI (DODA) model comprising a first unsupervised deep neural network model (DNN) (208A), a second unsupervised DNN (210A), a third unsupervised DNN (212A), a fourth unsupervised DNN (216A), and a fifth unsupervised DNN (218A);

a memory (200) that stores a database and a set of modules; and a device processor (202) that executes said set of modules, wherein said set of modules comprises:

a sampling module (206) that samples, using the DODA model, a subset of two-dimensional 2D frames from the video stream of a first camera (102A);

a label and location generation module (208) that generates labels and location for at least one object in the subset of 2D frames using the first unsupervised DNN (208A), wherein the at least one object comprises a product object, a cart object, a person object, a bag object, or a shelf object;

an anatomy classification module (210) that visually classifies anatomical parts of human body from the subset of 2D frames using the second unsupervised DNN (210A) to detect at least one person object in the physical retail store environment (106);

an enhancement module (212) that enlarges and enhances a part of the subset of 2D frames using the third unsupervised DNN (212A) with the labels and location to generate and identify at least one product object in association with the at least one person object;

an index generation module (214) that generates an index for the at least one product object in association with the at least one person object, wherein the index describes the product object with a machine representation as well as a human-readable representation;

a movement tracking module (216) that reidentifies, using the index, the at least one product object in association with the at least one person object in the video stream of a second camera (102B) using the fourth unsupervised DNN (216A) by tracking a movement of the at least one product object in the physical retail store environment (106); and     an activity classification module (218) that automatically classifies an activity associated with the movement of the at least one product object using the fifth unsupervised DNN (218A) to prevent shrinkage in the physical retail store environment (106), wherein the activity includes a scan activity, an in-bag activity, a no-scan activity, a mis-scan activity, or a theft activity.

8. The system as claimed in claim 7, wherein the processing unit obtains a real-time transaction feed of product object scans from the physical retail store environment (106) to classify the activity associated with the movement of the at least one object.

9. The system as claimed in claim 7, wherein the first unsupervised DNN (208A), the second unsupervised DNN (210A), the third unsupervised DNN (212A), the fourth unsupervised DNN (216A), and the fifth unsupervised DNN (218A) are configured in a cloud server that is connected to the plurality of cameras (102A-N) in the given network, wherein the plurality of cameras (102A-N) stream the set of two-dimensional (2D) frames to the cloud server.

10. The system as claimed in claim 7, wherein tracking the movement of the at least one product object in the physical retail store environment (106) further comprises combining a first video stream from the first camera (102A) and a second video stream from the second camera (102B) to generate an enhanced representation of the physical retail store environment (106).

\* \* \* \* \*